(12) United States Patent
Kronfli et al.

(10) Patent No.: US 6,409,867 B1
(45) Date of Patent: Jun. 25, 2002

(54) EXTRUSION OF POLYMER-BASED CELL COMPONENTS

(75) Inventors: Esam Kronfli, Swindon; Neville John Mattingley, Wantage, both of (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 09/463,020

(22) PCT Filed: Jul. 20, 1998

(86) PCT No.: PCT/GB98/02167

§ 371 (c)(1),
(2), (4) Date: Jan. 19, 2000

(87) PCT Pub. No.: WO99/05744

PCT Pub. Date: Feb. 4, 1999

(30) Foreign Application Priority Data

Jul. 23, 1997 (GB) .............................................. 9715392

(51) Int. Cl.⁷ .......................... H01M 4/04; H01M 10/12
(52) U.S. Cl. .............................. 156/244.11; 264/176.1; 264/177.1; 524/297; 429/217

(58) Field of Search .......................... 524/297; 429/217, 429/231.4, 231.8; 156/244.11; 264/177.1, 176.1; 29/623.3, 623.4, 623.1

(56) References Cited

U.S. PATENT DOCUMENTS 5,470,357 A * 11/1995 Schmutz et al. ........... 29/623.5
5,514,461 A * 5/1996 Meguro et al. .......... 428/310.5

* cited by examiner

*Primary Examiner*—Michael W. Ball
*Assistant Examiner*—Barbara J. Musser
(74) *Attorney, Agent, or Firm*—William H. Holt

(57) ABSTRACT

A method of making a cell component containing a polymer, the polymer consisting primarily of vinylidene fluoride, in which the polymer is mixed with at least one other ingredient, such as an organic plasticiser, and extruded at a temperature above its melting point. The method can be used to make electrolyte layers in which case the polymer would be mixed with at least a salt, and to make layers of composite material for use as anodes or cathodes, in which case the polymer would be mixed with at least a particulate insertion material. No solvents are required.

10 Claims, No Drawings

EXTRUSION OF POLYMER-BASED CELL COMPONENTS

This invention relates to a method of making a cell component containing a polymer, to a cell component so made, and to an electrochemical cell incorporating this cell component.

For many years it has been known to make rechargeable cells with lithium metal anodes, and cathodes of a material into which lithium ions can be intercalated or inserted. Such cells may use a separator such as filter paper or polypropylene saturated with, as electrolyte, a solution of a lithium salt (e.g. lithium perchlorate) in an organic liquid such as propylene carbonate. Alternatively they may use a solid-state ion-conducting polymer, for example a complex of a lithium salt with poly(ethylene oxide). A wide variety of intercalation or insertion materials are known as cathode materials, such as $TiS_2$, $V_6O_{13}$ and $Li_xCoO_2$ where x is less than 1; and these materials are often mixed with solid electrolyte material to form a composite cathode. To avoid the problems arising from dendrite growth at the anode, it has been proposed to use an intercalation material such as graphite as the anode material too, and this also may be mixed with solid electrolyte material to form a composite anode. Similar cells can be made in which sodium takes the place of lithium.

An alternative type of polymer electrolyte has recently been proposed by Gozdz et al (U.S. Pat. No. 5,296,318), which comprises a copolymer of 75 to 92% vinylidene fluoride and 8 to 25% hexafluoropropylene, blended with a lithium salt and a compatible solvent such as ethylene carbonate/propylene carbonate mixture and cast from solution in a low boiling-point solvent such as tetrahydrofuran. This is said to provide a stable film with conductivity in the range $10^{-4}$ to $10^{-3}$ S cm$^{-1}$. Patent application GB 2 309 701 A describes an electrolyte in which the PVdF/HFP copolymer is replaced by a polymeric chain consisting primarily of vinylidene fluoride onto which is grafted a mono-unsaturated carboxylic, sulphonic or phosphonic acid, ester or amide; as in Gozdz the electrolyte also comprises a salt and an organic solvent such as ethylene carbonate and/or propylene carbonate, and it is cast from solution in a low boiling point solvent such as dimethylacetamide or tetrahydrofuran. Although this process provides good quality electrolytes, it is inconvenient to have to evaporate the large quantities of low boiling point solvent involved.

According to the present invention there is provided a method of making a composite electrode for a cell, the method comprising mixing a polymer consisting primarily of vinylidene fluoride with an insertion material in particulate form and an organic plasticiser, and extruding the mixture, the organic plasticiser being mixed with the polymer prior to completion of the extrusion, and the extrusion being performed at a temperature above the melting point of the polymer so as to melt cast a non-porous film or sheet of the composite electrode.

The mixture to be extruded may also include an appropriate salt. The cell component may be a composite cathode or a composite anode, by incorporating an appropriate insertion material.

If the cell is a lithium cell (or a lithium ion cell) then the salt will be a lithium salt, such as lithium perchlorate $LiClO_4$. Other suitable salts are $LiAsF_6$, $LiPF_6$, $LiBF_4$, $LiN(SO_2CF_3)_2$, or $LiCF_3SO_3$; if the salt is to be extruded then it must be stable at the extrusion temperature. A variety of compatible plasticisers may be used, in particular ethylene carbonate or propylene carbonate; alternative plasticisers are diethoxyethane or diethyl carbonate. Plasticisers such as tetraethylene glycol dimethyl ether (tetraglyme), or N-methyl-pyrrolidone (1-methyl-2-pyrrolidone) may also be provided, to ensure that other plasticisers do not crystallise at the desired operating temperature and so to ensure adequate electrical conductivity. Other plasticisers which may be used are phthalates such as dibutylphthalate, esters of aliphatic dibasic acids such as dioctyladipate or dibutylsebacate, alkyl phosphates such as tributylphosphate, and polymeric polyesters of adipic acid such as poly (1, 3 butylene glycol/1, 2 propylene glycol/adipic acid ester). It will be appreciated that the plasticiser must have a boiling point above the extrusion temperature to ensure that at least the bulk of the plasticiser does not evaporate during extrusion.

The polymer comprises a polymeric chain consisting primarily of vinylidene fluoride and may be a homopolymer, i.e. polyvinylidene fluoride (PVdF), or may be a copolymer or terpolymer of vinylidene fluoride (VdF) and other monomers such as hexafluoropropylene (HFP), chlorotrifluoroethylene (CTFE), or tetrafluoroethylene (TFE), and in these cases the proportion of VdF is preferably no less than 70% by weight. The polymer may have further monomers grafted onto such a polymeric chain, in particular a mono-unsaturated carboxylic, sulphonic or phosphonic acid, ester or amide may be grafted onto the chain. Such a grafted polymer may have improved adhesion to metal components such as current collectors in a cell.

The monomers to be grafted must have only one double-bond in the carbon chain R—, and one or more carboxyl groups —COOH, sulphonic acid groups —SO$_2$OH, phosphonic acid groups —PO(OH)$_2$, ester groups —COOR', or amide groups —CONH$_2$. Generally smaller monomers, with less than five carbon atoms in the carbon chain R—, are preferable. For example acrylic acid; crotonic acid, vinylacetic acid, methylacrylic acid (isomers of butenoic acid); isomers of pentenoic acid such as allylacetic acid, or tiglic acid; or, as examples of monomers with more than one acid group, itaconic acid or maleic acid. The corresponding amides such as acrylamide may also be used. In an ester, the group R' might be methyl, ethyl, hydroxyethyl, or butyl; for example esters such as methyl acrylate or hydroxyethyl methacrylate may be used. Vinyl or styrene sulphonic acid may be used. The most preferred monomers to be grafted are acrylic acid or methacrylic acid. The grafting may be achieved by an irradiation process. For example the polymer chain substrate and the graft monomer material together may be subjected to continuous or intermittent irradiation, or more preferably the substrate may be pre-irradiated before it is brought into contact with the graft monomer material. The radiation may for example be an electron beam, or X-rays or γ-rays. The irradiation activates the substrate, apparently by generating free radicals.

The degree of grafting is determined by several factors, the most important being the length of time that the activated substrate is in contact with the graft monomer material, the extent of pre-activation of the substrate by the irradiation, the extent to which the graft monomer material can penetrate the substrate, and the temperature of the substrate and monomer material when in contact. If the graft monomer material is an acid, the degree of grafting can be monitored by sampling the solution containing the monomer, and titrating against a base to find the concentration of the acidic monomer remaining. The degree of grafting in the resulting composition is desirably between 2 and 20% of the final weight, more preferably between 3 and 12%, for example 5% or 10%.

In a second aspect the present invention provides a composite electrode in the form of a sheet or film of non-porous polymer-containing material made by extrusion as specified above; and in a third aspect it provides an electric cell incorporating at least one such composite electrode.

Thus the cell may incorporate a composite cathode made by extrusion, and/or a composite anode so made. The referred cell is a rechargeable lithium swing cell (that is, without lithium metal) with a composite anode and a composite cathode each comprising polymer mixed with appropriate insertion materials, each being made by extrusion, and separated by an electrolyte layer which may also be made by extrusion. The composite anode and the composite cathode must each be in contact with a suitable current collector such as copper or aluminium foil or mesh. In one method a composite electrode is extruded in tubular form, a strip of current collector foil is then inserted into the tube, and the tube is then squashed flat so the foil is sandwiched between sheets of composite electrode material. This last step may be performed using heated rollers to ensure the foil is bonded to the composite electrode material. In an alternative method a composite anode, a polymer electrolyte, and a composite cathode are all extruded, are then sandwiched between metal foils, and are bonded together by passing between heated rollers.

The invention will now be further and more particularly described, by way of example only. In all the Examples, the melt flow index of the polymer is a parameter measured in accordance with ASTM D1238. In those Examples in which a hydraulic press was used, the composition was pressed between sheets of mylar; in each case the sample spread out to an area less than that of a circle of diameter 90mm.

Polymer-based Composite Electrode Layers

Where a polymer-based composite electrode layer is to be used in combination with a separator and a liquid electrolyte (for example lithium hexafluorophosphate dissolved in an ethylene carbonate/propylene carbonate mixture) to form a cell, then it is not necessary for the composite layer initially to contain plasticiser. Where a polymer-based composite electrode layer is to be used in combination with a polymer-based electrolyte layer to form a cell, then the composite electrode layer must have adequate ionic conductivity; this may be ensured by including an appropriate salt and plasticiser in the layer as extruded, or by forming the layer without salt or plasticiser and subsequently soaking it in an organic liquid electrolyte. In either case it is necessary to ensure that the composite electrode layer adheres to the current collector, and this adhesion can be improved by the use of a grafted polymer. The invention relates to those layers which incorporate a plasticiser.

EXAMPLE A

This example uses grade 21510 Solvay Solef (trademarks) which is a vinylidene fluoride/hexafluoropropylene co-polymer (with the same melt flow index as the grade 1010 homopolymer i.e. 2 g/10 min at 230° C. at a load of 2.16 kg), and a melting point of 132° C.

PVdF/HFP powder was irradiated by a cobalt-60 gamma source for a total dose of 15 kgray, at a dose rate of 1 kgray hour$^{-1}$. The irradiated powder was then placed in a reaction vessel containing a de-oxygenated aqueous solution of acrylic acid (25% by weight) also containing ferrous sulphate (0.02 M) as a homopolymerisation inhibitor. This reaction mixture was held at 60° C. and the progress of the reaction with the acrylic acid was monitored at intervals by taking a sample of the mixture and determining the remaining concentration of the acid by titration with sodium hydroxide.

After a few hours, when the desired consumption of acrylic acid had been achieved, the resulting graft co-polymer powder was washed several times with deionised water, and then dried in a vacuum oven for 24 hours at 50° C. The weight of the powder was found to have increased, the increase being equal to 10% of the final weight, as a consequence of the grafting of acrylic acid into the polymer chain.

A mixture is made up as follows:

1 part PVdF-HFP/acrylic acid graft polymer
0.42 parts LiCF$_3$SO$_3$
1.7 parts ethylene carbonate
1.1 parts propylene carbonate
2.85 parts graphite These ingredients are well compounded, and then extruded at an extrusion temperature of between 165° and 205° C. to form pellets. The pellets are then extruded again to form a strip of composite anode material 200 mm wide and 0.1 mm thick, onto a copper foil 0.01 mm thick, and laminated between heated nip rollers immediately after extrusion.

EXAMPLE B

This example uses the Solef grade 21510 PVdF/HFP copolymer as in Example A, and grafts acrylic acid onto the polymer chain in the same manner, so the increase in weight is again 10% of the final weight.

A mixture is made up as follows:

1 part PVdF-HFP/AA graft polymer
0.6 parts LiCF$_3$SO$_3$
2.2 parts ethylene carbonate
1.5 parts propylene carbonate
7 parts LiNiO$_2$
0.16 parts carbon These ingredients are well mixed, and then extruded to form pellets at an extrusion temperature of between 165° and 205° C. The pellets are then extruded again to form a strip of composite cathode material of thickness 0.1 mm and width 200 mm, and laminated onto an aluminium foil 0.02 mm thick by passing between heated nip rollers immediately after extrusion.

The next two examples relate to composite anode layers using un-grafted PVdF.

EXAMPLE C

This example used Solef grade 1015 which is a PVdF homopolymer with a melt flow index at 230 of 0.7 g/10 min at a load of 10 kg, and a melting point of 172° C. The ingredients used were as follows:

1 part PVdF
0.13 parts stearic acid
5.67 parts graphite
2 parts dibutylsebacate (DBS)

The PVdF and stearic acid were mixed together and hen introduced into a twin screw extruder with two mixing zones. The graphite was introduced at the start of the screw, being fed from two hoppers, and the dibutylsebacate plasticiser was added by volumetric pump just before the first mixing zone. The temperature throughout the extruder was at 180° C. The extruder produced a layer 0.30 mm thick which was then calendered to produce a film of thickness 0.10 mm.

This anode layer was then tested in a test cell with an ethylene carbonate/dimethyl carbonate electrolyte containing lithium hexafluorophosphate, and a lithium counter electrode. This test cell was cycled between 0.01 and 1.5 volts. The anode was found to intercalate lithium ions, and this intercalation was at least partly reversible.

EXAMPLE D

This example used Solef grade EX1300 which is a PVdF homopolymer with a melt flow index at 230° C. of 2.5 g/10 min at a load of 10 kg, and a melting point of about 173° C.

A mixture was made up as follows:

1 part PVdF
1.14 parts ethylene carbonate
2.76 parts graphite

These ingredients were mechanically blended, and then melt blended in a twin screw cavity mixer at 174° C. for 10 minutes at 35 rpm. A thin layer was then made by pressing this mixture at 200° C. in a hydraulic press as described above for five minutes, the load on the platens being about 6.4 tonnes. The final thickness was 0.10 mm.

This anode layer was then tested in a test cell with an ethylene carbonate/dimethyl carbonate electrolyte containing lithium hexafluorophosphate, and a lithium counter electrode. This test cell was cycled between 0.01 and 1.5 volts. The anode was found to intercalate lithium ions, and this intercalation was mostly reversible. (The plasticiser DBS is commonly used with PVdF, but does not enhance the conductivity; consequently the composition in Example C does not perform as well, as an anode, as that in Example D).

The next example relates to a composite cathode layer using un-grafted polymer.

EXAMPLE E

This example used Solef grade 21010 which is a VdF/HFP copolymer with a melt flow of index at 230° C. of 6 g/10 min at a load of 5 kg; and with a melting point of 146° C.

A mixture was made as follows:

1 part PVdF/HFP
0.8 parts ethylene carbonate
0.4 parts conductive carbon
2.12 parts LiMn2O4

These ingredients were mechanically blended, and then melt blended in a twin screw cavity mixer at 172° C. for 10 minutes at 40 rpm. A thin layer was then made by pressing this mixture at 200° C. in a hydraulic press as described above for five. minutes, the load on the platens being about 8.1 tonnes. The final thickness was 0.10 mm.

It will be appreciated that a similar composition may be made with a homopolymer, for example Solef grade EX1300 homopolymer as described in Example D.

In making a composite anode or cathode the proportions (by weight) of the ingredients are preferably:

| | |
|---|---|
| PVdF | 15% to 30% |
| plasticiser | 15% to 30% | the remainder being graphite (in the case of an anode) or:

| | |
|---|---|
| carbon | 7% to 15% | and insertion material (in the case of a cathode).

What is claimed is:

1. A method of making a composite electrode for a cell said composite electrode comprising a non-porous film or sheet the method comprising mixing a polymer consisting primarily of vinylidene fluoride with an insertion material in particulate form and an organic plasticiser, and extruding the mixture, the organic plasticiser being mixed with the polymer prior to completion of the extrusion, and the extrusion being performed at a temperature above the melting point of the polymer so as to form said non-porous film or sheet of the composite electrode.

2. A method as claimed in claim 1 wherein the polymer comprises a polymeric chain which is a vinylidene fluoride homopolymer.

3. A method as claimed in claim 1 wherein the polymer comprises a polymeric chain which is a copolymer or terpolymer of vinylidene fluoride and other monomers.

4. A method as claimed in claim 2 wherein the polymer has a mono-unsaturated carboxylic, sulphonic or phosphonic acid, ester or amide grafted onto the chain.

5. A method as claimed in claim 1 wherein the mixture to be extruded includes a salt.

6. A method as claimed in claim 1 wherein the proportions by weight of the polymer and of the organic plasticiser are each in the range 15% to 30%.

7. A method as claimed in claim 6 wherein the composite electrode is a cathode, and comprises between 7% and 15% by weight of carbon, in addition to the particulate insertion material.

8. A method of making a cell wherein a composite anode is made by a method as claimed in claim 1; and a composite cathode is made by a method as claimed in claim 1; the composite anode and the composite cathode are separated by a layer of electrolyte material, and sandwiched between metal current collectors, and are bonded together by passing between heated rollers.

9. A method as claimed in claim 3 wherein the polymer has a mono-unsaturated carboxylic, sulphonic or phosphonic acid, ester or amide grafted onto the chain.

10. A method as claimed in claim 1 wherein the organic plasticiser comprises at least one plasticiser selected from the group consisting of ethylene carbonate, propylene carbonate, diethyl carbonate and diethoxyethane.

* * * * *